(12) United States Patent
Fulghum et al.

(10) Patent No.: US 7,933,345 B2
(45) Date of Patent: Apr. 26, 2011

(54) METHOD AND APPARATUS FOR DETERMINING COMBINING WEIGHTS FOR MIMO RECEIVERS

(75) Inventors: Tracy L. Fulghum, Durham, NC (US); Stephen J. Grant, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1051 days.

(21) Appl. No.: 11/613,677

(22) Filed: Dec. 20, 2006

(65) Prior Publication Data

US 2008/0152053 A1    Jun. 26, 2008

(51) Int. Cl.
*H04K 1/10* (2006.01)
(52) U.S. Cl. ...................................................... 375/260
(58) Field of Classification Search .................. 375/260, 375/267, 316, 340, 343, 346, 348, 349
See application file for complete search history.

(56) References Cited

U.S. PATENT DOCUMENTS

| | | | |
|---|---|---|---|
| 6,005,887 A | 12/1999 | Bottomley et al. | |
| 2001/0028677 A1 | 10/2001 | Wang et al. | |
| 2003/0031234 A1 | 2/2003 | Smee et al. | |
| 2005/0111528 A1 | 5/2005 | Fulghum et al. | |
| 2005/0195889 A1 | 9/2005 | Grant et al. | |
| 2005/0201447 A1 | 9/2005 | Cairns et al. | |
| 2006/0251156 A1* | 11/2006 | Grant et al. | 375/148 |
| 2007/0092019 A1* | 4/2007 | Kotecha et al. | 375/267 |
| 2008/0291978 A1 | 11/2008 | Jonsson et al. | |
| 2009/0213944 A1* | 8/2009 | Grant | 375/260 |

FOREIGN PATENT DOCUMENTS

| | | |
|---|---|---|
| WO | 2005096517 A1 | 10/2005 |
| WO | 2006037593 A1 | 4/2006 |
| WO | 2006132593 A2 | 12/2006 |
| WO | 2008/076053 A2 | 6/2008 |

OTHER PUBLICATIONS

Bottomley et al. "A Generalized RAKE Receiver for Interference Suppression." IEEE Journal on Selected Areas in Communications, Aug. 2000, pp. 1536-1545, vol. 18, No. 8, IEEE, Piscataway, NJ, US.
3RD Generation Partnership Project. 3GPP TS 25.214, V8.3.0 (Sep. 2008). 3rd Generation Partnership Project; Technical Specification Group Radio Access Network; Physical layer procedures (FDD) (Release 8). Sep. 2008. 3RD Generation Partnership Project. 3GPP TS 25.101, V8.4.0 (Sep. 2008). 3rd Generation Partnership Project; Technical Specification Group Radio Access Network; User Equipment (UE) radio transmission and reception (FDD) (Release 8). Sep. 2008.
Grant, Stephen J. et al. "Generalized RAKE Recievers for MIMI Systems." 2003 IEEE 58th Vehicular Technology Conference. Oct. 6-9, 2003, vol. 1, pp. 424-428.

* cited by examiner

*Primary Examiner* — Chieh M Fan
*Assistant Examiner* — Jaison Joseph
(74) *Attorney, Agent, or Firm* — Coats & Bennett, P.L.L.C.

(57) ABSTRACT

According to a method and apparatus taught herein, the computation of intermediate combining weights considers impairment correlations common to two received signal streams, but does not account for cross-stream interference attributable to channel reuse between the two streams. Excluding consideration of channel reuse cross-stream interference from the computation of intermediate combining weights simplifies intermediate combining weight computation and increases computational robustness. Further, final combining weights, such as for Generalized Rake combining or equalization combining, may be obtained efficiently from the intermediate combining weights through the use of weight scaling factors, which do account for channel reuse cross-stream interference. Moreover, in at least some instances, the intermediate combining weights are of interest. For example, signal quality estimates for one or both streams may be computed from the corresponding intermediate combining weights.

26 Claims, 3 Drawing Sheets

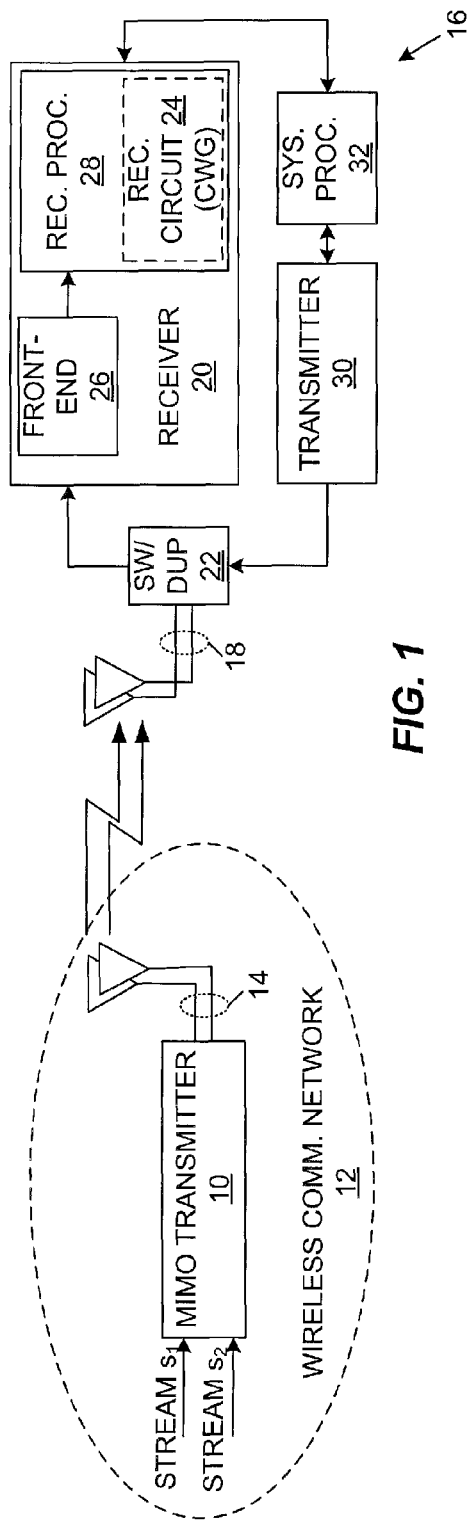
FIG. 1
FIG. 2
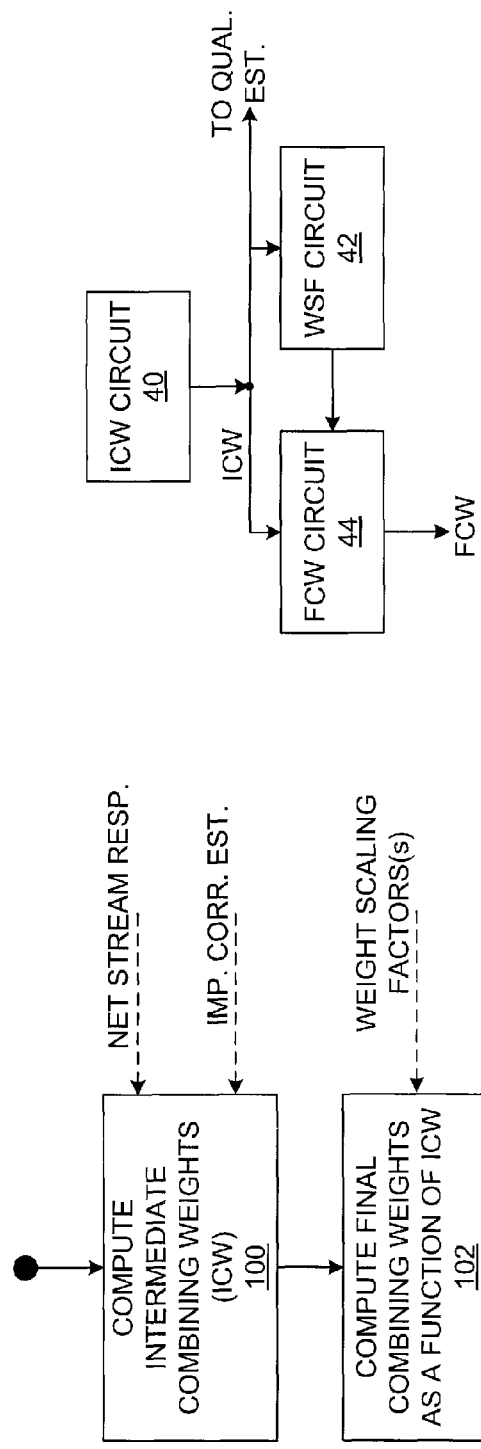
FIG. 3

METHOD AND APPARATUS FOR DETERMINING COMBINING WEIGHTS FOR MIMO RECEIVERS

BACKGROUND

1. Field of the Invention

The present invention generally relates to multiple-input-multiple-output (MIMO) communication systems, and particularly relates to determining combining weights for MIMO receivers.

2. Background

MIMO systems generally use one or more channelization techniques to distinguish the different transmitted information streams. For example, MIMO systems based on Code Division Multiple Access (CDMA) signal types use orthogonal code sets to define different information channels, where each such channel carries individually resolvable data. MIMO systems based on Orthogonal Frequency Division Multiplexing (OFDM) signal types use different sub-carriers in a set of OFDM sub-carriers to define different channels. However, these and other types of MIMO systems commonly reuse channelization codes and or channelization frequencies across transmitted data streams, possibly on distinct antennas, leading to so-called "reuse" interference between streams at the targeted receivers-broadly denoted as "channel reuse cross-stream interference."

Robust interference suppression, such as that generally afforded by Generalized Rake (G-Rake) receivers, equalization receivers, and other types of linear interference canceling receivers, must include suppression of channel reuse cross-stream interference in MIMO and other contexts where such interference arises. However, the consideration of channel reuse cross-stream interference by a receiver in interference suppression processing introduces potentially significant computational complexity. Further, existing signal processing algorithms for determining interference-suppression combining weights may not converge in a practical number of iterations (or at all) when channel reuse cross-stream interference is considered.

For example, it is known in non-MIMO G-Rake processing contexts how to determine combining weights from signal impairment correlation estimates, where the various components of impairment include same-cell interference (i.e., Inter-Symbol Interference or ISI), other-cell interference, and thermal noise. The overall impairment correlation estimate, which represents the correlation of received signal impairment across G-Rake despreading fingers, thus includes a same-cell impairment correlation term, an other-cell impairment correlation term, and a thermal noise impairment term. (Some approaches to impairment correlation modeling collapse the other-cell and thermal noise terms into a combined term.)

Extending the above context to MIMO systems with channel reuse, received signal impairment includes channel reuse cross-stream interference. Therefore, the expression of received signal impairment correlations used for combining weight generation must include a corresponding impairment correlation term. More particularly, considering channel reuse cross-stream interference in the impairment correlation model introduces, in at least some approaches to modeling impairment correlations, a rank-one component making the combining weight solution more difficult (or practically impossible) to determine. Further, the need for calculating mode-dependent combining weights for MIMO operation—i.e., the computation of combining weights for each of two or more possible MIMO transmission modes—exacerbates the problems raised by the increased complexity of the underlying combining weight calculations.

SUMMARY

Considering the impairment correlations arising from cross-stream interference arising from channel reuse in MIMO systems introduces significant computational problems in G-Rake receivers, and in other types of interference suppression receivers. To that end, a method and apparatus disclosed herein determine intermediate combining weights based on a simplified impairment correlation representation that excludes channel reuse cross-stream interference. These intermediate combining weights are useful in reporting channel quality information for at least some modes of MIMO operation. Moreover, the intermediate combining weights provide a computationally efficient and robust basis for computing final combining weights that do consider channel reuse cross-stream interference.

In one embodiment, a method of determining combining weights for a MIMO receiver comprises computing intermediate combining weights for two received signal streams as a function of impairment correlations that do not account for cross-stream interference attributable to channel reuse between the two streams. The method continues with computing final combining weights for at least one of the two streams as a function of the intermediate combining weights computed for the two streams and a weight scaling factor. The weight scaling factor accounts for the cross-stream interference attributable to channel reuse between the two streams.

In another embodiment, a receiver circuit for determining combining weights for a MIMO receiver comprises one or more processing circuits configured to compute intermediate combining weights for two received signal streams as a function of impairment correlations that do not account for cross-stream interference attributable to channel reuse between the two streams. The receiver circuit is further configured to compute final combining weights for at least one of the two streams as a function of the intermediate combining weights computed for the two streams and a weight scaling factor. As explained earlier, the weight scaling factor accounts for the cross-stream interference attributable to channel reuse between the two streams.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a MIMO transmitter and receiver, wherein the receiver includes a computationally efficient and robust combining weight generation circuit for interference suppression.

FIG. 2 is a logic flow diagram of one embodiment of processing logic for the computationally efficient and robust combining weight generation.

FIG. 3 is a block diagram of one embodiment of processing circuits supporting combining weight generation as taught herein.

DETAILED DESCRIPTION

Figure 4:
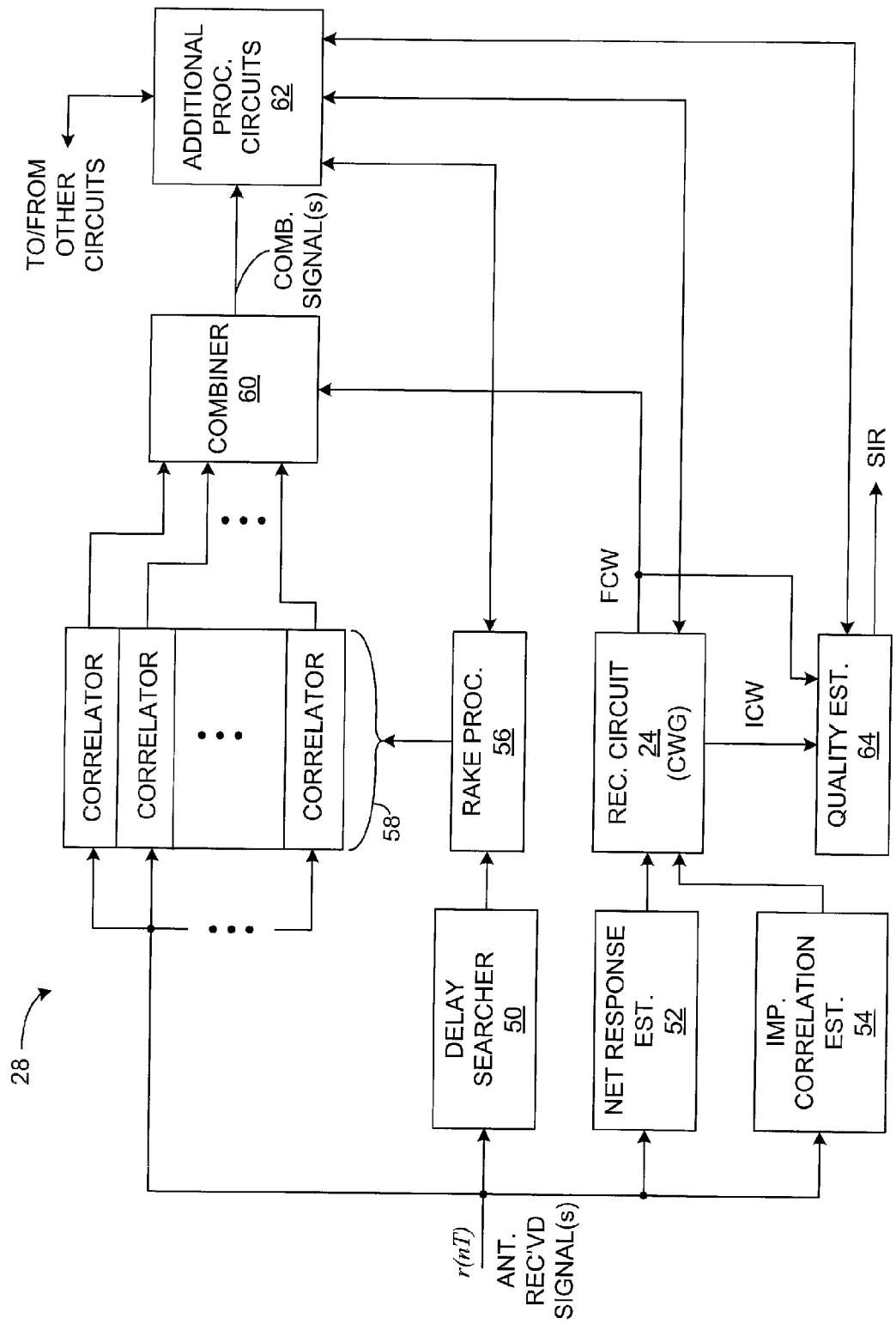
FIG. 4 is a block diagram of one embodiment of a G-Rake implementation of the receiver introduced in FIG. 1.

FIG. 1 illustrates a Multiple-Input-Multiple-Output (MIMO) transmitter 10 in a wireless communication network 12 that is configured to transmit MIMO signals via two or more transmit antennas 14 to a wireless communication device or system 16, such as a cellular radiotelephone or other communication terminal or module. The MIMO transmitter 10 channelizes different information streams transmitted by it using different channelization strategies. For example, in CDMA embodiments of the transmitter 10, it uses different spreading codes to transmit different information streams. In OFDM embodiments, it uses different sub-carrier frequencies for the same purpose.

In this context, one may assume that the transmitter 10 reuses one or more channels for the transmission of two or more streams. For example, in a CDMA system, the transmitter 10 may reuse the same spreading code(s) across streams, resulting in at least first and second streams being transmitted using the same channel code(s). As such, the signals received at the antennas 18 of the wireless communication device 16 include first and second received signal streams that are subject to cross-stream interference arising from the channel reuse between the two streams.

Advantageously, a receiver 20 coupled to the antennas 18 through a switch or duplexer 22 includes a receiver circuit 24 that is configured to generate MIMO combining weights that suppress cross-stream interference arising from channel reuse based on a computationally efficient and robust method of accounting for such interference in the combining weight generation process. In this example context, the receiver 20 includes a front-end circuit 26, one or more receiver processing circuits 28, which include the advantageous receiver circuit 24, a transmitter 30, and a system processor 32.

The receiver circuit 24, hereinafter referred to as the "combining weight generator" 24, implements a method of determining MIMO combining weights for interference suppression. FIG. 2 illustrates one embodiment of the method, and FIG. 3 illustrates corresponding functional circuits. More particularly, FIG. 3 depicts an embodiment of the receiver circuit 24 that includes an intermediate combining weight (ICW) circuit 40, a weight-scaling factor (WSF) circuit 42, and a final combining weight (FCW) circuit 44.

With these functional circuits in mind, and assuming the reception of first and second streams related by channel reuse at the transmitter 10, the processing of FIG. 2 begins with computing intermediate combining weights for two received signal streams as a function of impairment correlations that do not account for cross-stream interference attributable to channel reuse between the two streams (Step 100). Thus, as will be detailed later herein, the ICW circuit 40 may be configured to compute intermediate combining weights using a Gauss-Seidel iterative process, wherein the iterative computations are simplified by omitting impairment correlation terms that arise from cross-stream interference attributable to channel reuse between the first and second streams at the transmitter 10.

Processing continues with computing final combining weights for at least one of the two streams as a function of the intermediate combining weights computed for the two streams and a weight scaling factor that accounts for the cross-stream interference attributable to channel reuse between the two streams (Step 102). Thus, as will be detailed later herein, the WSF circuit 42 may be configured to compute weight scaling factors that account for cross-stream interference arising between the two streams because of channel reuse. In turn, the weight scaling factor(s) may then be used by the FCW 44 in conjunction with the intermediate combining weights, to determine final MIMO combining weights for the first and/or second stream. With this processing approach above, which is referred to herein as the "rank-one update" approach, the final combining weights account for the cross-stream interference between the first and second streams arising from channel reuse, yet their computation avoids the computational complexities that arise when such interference is considered directly.

To understand the simplified computation of intermediate combining weights based on the omission of impairment correlation terms attributable to cross-stream interference arising from channel reuse, one may express the overall received signal impairment correlations for a first received signal stream as, $$R_z(1) = \alpha_{CR2} h_2 h_2^H + \alpha_1 R_1 + \beta R_N \quad \text{Eq. (1)}$$

and for a second received signal stream as, $$R_z(2) = \alpha_{CR1} h_1 h_1^H + \alpha_1 R_1 + \beta R_N \quad \text{Eq. (2)}$$

where $h_1$ and $h_2$ are net stream responses for the first and second streams, respectively, and $\alpha_{CR1}$ are $\alpha_{CR2}$ scaling factors for the channel reuse cross-stream interference terms for the first and second streams, respectively, which depend on relative transmit power allocations of the two streams. Further, $\alpha_1 R_1$ is a scaled impairment correlation matrix corresponding to the ISI component of the same-cell self-interference, and $\beta R_N$ is a properly scaled impairment correlation matrix corresponding to generalized other-cell interference and (thermal) noise. (Note that the $\alpha_1 R_1$ term is present with CDMA-based channelization, but generally are not present with OFDM-based channelization.)

In examining the expressions given in Eq. (1) and Eq. (2), one sees that the term $\alpha_{CR2} h_2 h_2^H$ is unique to Eq. (1) and the term $\alpha_{CR1} h_1 h_1^H$ unique to Eq. (2). These unique terms represent cross-stream interference arising from channel reuse between the two streams at the transmitter 10. Notably, the terms $\alpha_1 R_1 + \beta R_N$ are common to both streams. Thus, one may let R represent the common impairment correlation terms as, $$R = \alpha_1 R_1 + \beta R_N \quad \text{Eq. (3)}$$

For the $m^{th}$ stream, then, a conventional expression for the final combining weights is given as, $$w_m = R_z^{-1}(m) h_m \quad \text{Eq. (4)}$$

However, using R as given in Eq. (3), the combining weight generator 24 expresses intermediate combining weights as, $$v_m = R^{-1} h_m \quad \text{Eq. (5)}$$

Thus, the intermediate combining weights for the first stream are given as, $$v_1 = R^{-1} h_1 \quad \text{Eq. (6)}$$

Likewise, the intermediate combining weights for the second stream are given as, $$v_2 = R^{-1} h_2 \quad \text{Eq. (7)}$$

With the expressions given in Eq. (6) and Eq. (7), the receiver circuit 24 is configured to compute the intermediate combining weights for each stream at least based on estimated impairment correlations arising from noise and other-cell interference common to both streams, i.e., the $\beta R_N$ impairment correlation terms. For CDMA embodiments where time-dispersive propagation channels compromise code orthogonality, the receiver circuit 24 is configured compute the intermediate combining weights for each stream further based on estimated impairment correlations arising from same-cell interference common to both streams, i.e., the $\alpha_1 R_1$ term. In at least some circumstances, such as in CDMA embodiments, same-cell interference may be more important. Thus, in at least one embodiment, the receiver circuit 24 is configured to compute the intermediate combining weights at least based on noise and same-cell interference common to both streams. The receiver circuit 24 also may consider other-cell interference in its intermediate combining weight computations. Further, it should be understood that other-cell interference may be considered together with noise in a single combined impairment correlation term.

In any case, a Gauss-Seidel iterative solution of the intermediate combining weights benefits from the elimination of the problematic, rank-one impairment correlation terms corresponding to the channel reuse interference, i.e., the $\alpha_{CR2} h_2 h_2^H$ term in Eq. (1) and the $\alpha_{CR1} h_1 h_1^H$ in Eq. (2). Substituting R from Eq. (3) into Eq. (1) and Eq. (2), the stream-specific impairment correlations for the first and second streams may be expressed as, $$R_z(1) = R + \alpha_{CR2} h_2 h_2^H \quad \text{Eq. (8)}$$

and $$R_z(2) = R + \alpha_{CR1} h_1 h_1^H \quad \text{Eq. (9)}$$

Returning to expressions for final combining weights, the MIMO weight solution for reception of the first stream is given as, $$w_1 = R_z^{-1}(1) h_1 \quad \text{Eq. (10)}$$

which then becomes, $$w_1 = (R + \alpha_{CR2} h_2 h_2^H)^{-1} h_1 \quad \text{Eq. (11)}$$

Applying the matrix inversion lemma results in the following expression:

$$w_1 = v_1 - v_2 \left( \frac{\alpha_{CR2} v_2^H h_1}{1 + \alpha_{CR2} v_2^H h_2} \right) \quad \text{Eq. (12)}$$

or $$w_1 = v_1 - a v_2 \quad \text{Eq. (13)}$$

where "a" is a (complex valued) weight scaling factor expressed as $$\frac{\alpha_{CR2} v_2^H h_1}{1 + \alpha_{CR2} v_2^H h_2},$$

which is a function of the net stream responses $h_1$ and $h_2$ for the first and second stream and the channel parameter reuse scaling factors for the first and second streams. By following the same mathematical development, the final MIMO combining weight solution for the second stream may be expressed in terms of the intermediate combining weights as follows, $$w_2 = v_2 - v_1 \left( \frac{\alpha_{CR1} v_1^H h_2}{1 + \alpha_{CR1} v_1^H h_1} \right) \quad \text{Eq. (14)}$$

or $$w_2 = v_2 - b v_1 \quad \text{Eq. (15)}$$

where the weight scaling factor "b" equals $$\frac{\alpha_{CR1} v_1^H h_2}{1 + \alpha_{CR1} v_1^H h_1}.$$

Thus, the final weight solutions consist of a scaled sum of the intermediate weight solutions, where part of the scaling involves relatively simple inner products. More particularly, the receiver circuit 24 is configured to compute the final combining weights for a first one of the two streams by forming a linear combination of the intermediate combining weights $v_1$ (or $v_2$) determined for the first one of the two streams and the intermediate combining weights $v_2$ (or $v_1$) determined for the other one of the two streams, as scaled by the appropriate weight scaling factor.

From the expressions for the a and b weight scaling factors, one sees that the receiver circuit 24 is configured to compute the weight scaling factor a for determination of the intermediate combining weight for the first stream as a function of the intermediate combining weights determined for the second stream and net stream responses determined for the two streams. The weight scaling factor determination also considers the channel reuse scaling factors, which, as noted, depend on relative transmit power allocations of the two streams. Similarly, the receiver circuit 24 generates the weight scaling factor b as a function of the intermediate combining weights determined for the first stream, and the net stream responses and channel reuse scaling factors for the first and second streams.

Note that if only the first stream is of interest to the receiver 20, then the final combining weight $w_1$ is calculated from Eq. (13) and the final combining weight $w_2$ need not be computed. Conversely, if only the second stream is of interest to the receiver 20, then the final combining weight $w_2$ is calculated from Eq. (15), and the final combining weight $w_1$ need not be computed.

To appreciate the computational efficiency of the above approach to combining weight determination, one can compare the compare a "conventional" combining weight solution to the rank-one update method presented herein. The conventional G-Rake approach to computing combining weights from Eq. (1) and Eq. (2) computes the Hermitian outer product of the net stream response vectors, i.e., it computes $h_1 h_1^H$ and $h_2 h_2^H$, which requires approximately $$4 \left( \frac{N^2 + N}{2} \right)$$

computational cycles for each outer product. Conventional processing then performs a real-complex multiplication of the Hermitian symmetric result by the corresponding channel reuse scaling factor, which requires approximately $$2 \left( \frac{N^2 + N}{2} \right)$$

for each multiplication. Then, the conventional application of the Gauss-Seidel algorithm to solving for the $R_z(1)$ and $R_z(2)$ matrices "costs" approximately $2[M_{GS0}(4N^2 - N) + 20N]$ computational cycles for both $w_1$ and $w_2$, where $M_{GS0}$ is the number of Gauss-Seidel iterations applied to obtain the weight solution.

Totaling the estimated computational cycles required for the conventional approach yields an overall estimate of computational cycles of $2M_{GS0}(4N^2-N)+6N^2+46N$ cycles to calculate the combining weights for both streams. In contrast, in the rank-one update method taught herein, the $R_z(1)$ and $R_z(2)$ matrices represented in Eq. (1) and Eq. (2) are not explicitly calculated. Instead, according to the method taught herein, the intermediate weights are solved from the impairment correlation terms common to both streams, R, which represents the received signal stream impairment correlations excluding the impairment correlations arising from channel reuse.

The computation of $v_1=R^{-1}h_1$ and $v_2=R^{-1}h_2$ requires approximately $M_{GS1}(4N^2-N)+20N$ cycles for each intermediate combining weight. That is, for the two-stream example above, the method taught herein uses two applications of the Gauss-Seidel algorithm with $M_{GS1}$ iterations. In doing so, the combining weight generator 24 computes the complex inner products $v_1^H h_1$, $v_2^H h_2$, $v_1^H h_2$, and $v_2^H h_1$, which each require approximately 4N computational cycles. Processing then continues with the calculation of the weight scaling factor ratios $$a = \frac{\alpha_{CR2} v_1^H h_2}{1+\alpha_{CR2} v_1^H h_1} \text{ and } b = \frac{\alpha_{CR1} v_2^H h_1}{1+\alpha_{CR1} v_2^H h_2},$$

in which a complex number is divided by a real number and approximately 16+2 computational cycles are required. The final calculation of $w_1$ and $w_2$ are the complex scaling and adding of one intermediate weight vector with the other, which requires approximately 4N computational cycles. Summing the complexity of all these operations yields $2M_{GS1}(4N^2-N)+64N+34$ to compute the final combining weights for both streams.

Not only does the rank-one update approach taught herein require fewer computational cycles for most practical processing scenarios, it avoids the potential convergence problems that arise when the Gauss-Seidel iterative approach is used to directly solve Eq. (1) and Eq. (2) in the presence of cross-stream interference arising from channel reuse. Of course, the channel reuse term can cause computability problems with other numerical solution methods not based on the Gauss-Seidel algorithm. Thus, those skilled in the art will recognize that the Gauss-Seidel context represents a non-limiting example, and that the teachings herein apply advantageously to other numerical processing methods as well.

These advantages yield meaningful processing improvements in a variety of MIMO receiver applications. For example, FIG. 4 illustrates a G-Rake embodiment of the receiver processing circuits 28, which comprise a delay searcher 50, a net response estimator 52, an impairment correlation estimator 54, Rake processing circuits 56 (e.g., finger placement processing), a plurality of Rake fingers (correlators) 58, a combiner 60, and additional processing circuits 62 (e.g., decoding, etc.).

In operation, the Rake processor 56 sets the delay alignments of the fingers 58 based on Power Delay Profiles (PDPs), which indicate the dominant delay components in the antenna-received signals. Again, assuming a two-stream cross-interference scenario, the net response estimator 52 determines the $h_1$ and $h_2$ for the first and second streams, and the impairment correlation estimator 54 determines the impairment correlation estimates as represented by the impairment covariance matrix R.

The combining weight generator 24 uses the R and $h_1$, $h_2$ values to compute intermediate combining weights $v_1$ and $v_2$ using the rank-one update method taught herein. In operating circumstances where a single one of the first and second streams is of interest, a signal quality estimator 64 can be configured to estimate received signal quality for the stream of interest using the intermediate combining weights. Thus, for this reason and because of other possible uses, the intermediate combining weights have value beyond providing a computationally efficient and robust basis for final combining weight combination.

Of course, for MIMO combining of despread values from the fingers 58, which include despread values corresponding to one or both of the streams, the combining weight generator 24 computes final combining weights, e.g., $w_1$ and $w_2$, which allows the combiner 60 to combine the finger signals using the combining weights and thereby provide interference suppression, including suppression of cross-stream interference arising from channel reuse between the two streams at the transmitter 10. The interference-suppressed combined signal (or signals for two or more streams of interest) are input to the additional processing circuits 62, which decode the combined signal(s) for information recovery, etc.

Figure 5:
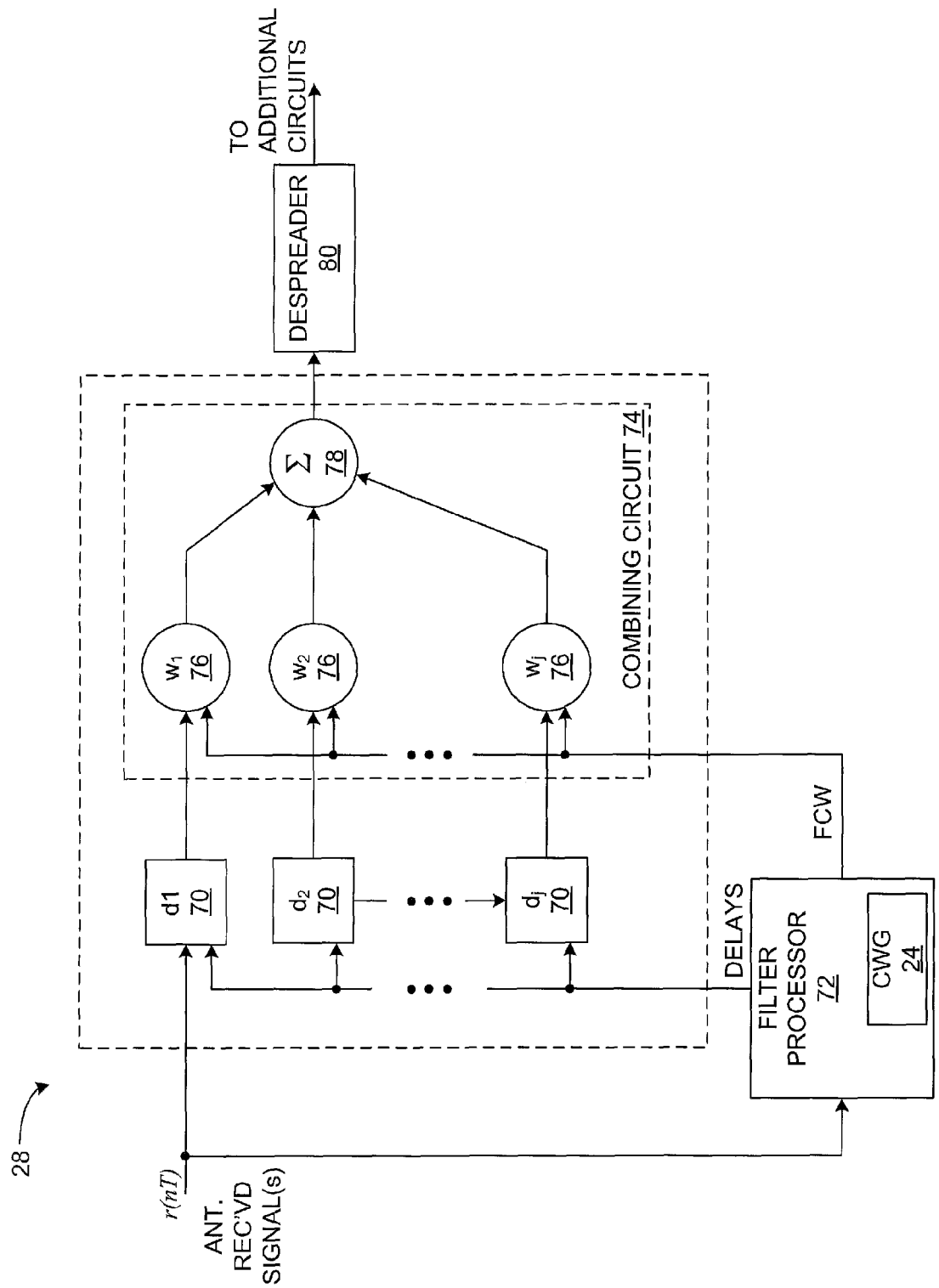
FIG. 5 is a block diagram of one embodiment of a equalizer implementation of the receiver introduced in FIG. 1.

FIG. 5 illustrates similar processing, but depicts an equalizer embodiment of the receiver processing circuits 28 comprising a plurality of delay elements 70, a filter processor 72, a combining circuit 74, including weighting circuits 76 and a summing circuit 78, and a despreader 80. The filter processor 72 is configured to generate net stream response estimates and the estimates of the common impairment correlations, such that the combining weight generator 24 computes final combining weights $w_1$ and/or $w_2$ for use by the weighting circuits 76.

With the two receiver examples immediately above in mind, those skilled in the art will appreciate that the combining weight determination method as taught herein has broad application to a variety of receiver types, and to a variety of communication system standards, including both CDMA and OFDM systems. Thus, those skilled in the art will appreciate that the present invention is not limited by the foregoing description and accompanying drawings. Instead, the present invention is limited only by the claims and their legal equivalents.

What is claimed is:

1. A method of determining combining weights, said method being carried out in a Multiple-Input-Multiple-Output (MIMO) receiver and comprising:
   computing intermediate combining weights for two received signal streams as a function of impairment correlations that do not account for cross-stream interference attributable to channel reuse between the two streams; and
   computing final combining weights for at least one of the two streams as a function of the intermediate combining weights computed for the two streams and a weight scaling factor that accounts for the cross-stream interference attributable to channel reuse between the two streams.

2. The method of claim 1, wherein computing intermediate combining weights for two received signal streams as a function of impairment correlations that do not account for cross-stream interference attributable to channel reuse between the two streams comprises computing intermediate combining weights for each of the two streams based on impairment correlation estimates common to both streams.

3. The method of claim 2, wherein computing intermediate combining weights for each of the two streams based on impairment correlation estimates common to both streams comprises computing the intermediate combining weights for each stream at least based on estimated impairment correlations arising from noise and same-cell interference common to both streams.

4. The method of claim 3, further comprising computing the intermediate combining weights for each stream further based on estimated impairment correlations arising from other-cell interference common to both streams.

5. The method of claim 1, further comprising, for a first one of the two streams, computing the weight scaling factor as a function of the intermediate combining weights determined for the other one of the two streams and net stream responses determined for the two streams.

6. The method of claim 5, wherein computing final combining weights for at least one of the two streams as a function of the intermediate combining weights computed for the two streams and a weight scaling factor that accounts for the cross-stream interference attributable to channel reuse between the two streams comprises, for the first one of the two streams, forming a linear combination of the intermediate combining weights determined for the first one of the two streams and the intermediate combining weights determined for the other one of the two streams, as scaled by the weight scaling factor.

7. The method of claim 5, further comprising computing the weight scaling factor as a further function of one or more channel reuse scaling factors that depend on relative transmit power allocations of the two streams.

8. The method of claim 1, further comprising, when the receiver is operating in a Single-Input-Multiple-Output (SIMO) mode where only one of the two streams is of interest, estimating signal quality for the stream of interest based on the intermediate weights computed for the stream of interest.

9. The method of claim 8, further comprising, when the receiver is operating in a MIMO mode where both of the two streams are of interest, estimating signal quality for the two streams based on the final combining weights computed for the two streams.

10. The method of claim 1, further comprising, for at least one of the two streams, estimating signal quality for the at least one stream based on the intermediate combining weights computed for the at least one stream.

11. The method of claim 1, wherein the receiver receives a plurality of streams, including the two streams, and wherein computing intermediate combining weights for two received signal streams as a function of impairment correlations that do not account for cross-stream interference attributable to channel reuse between the two streams comprises computing intermediate combining weights for each stream in the plurality of streams as a function of impairment correlations that do not account for cross-stream interference attributable to channel reuse between any two of the streams.

12. The method of claim 11, wherein computing final combining weights for at least one of the two streams as a function of the intermediate combining weights computed for the two streams and a weight scaling factor that accounts for the cross-stream interference attributable to channel reuse between the two streams comprises computing final combining weights for a least one of the plurality of streams based on the intermediate combining weights computed for the plurality of streams and one or more weight scaling factors that account for cross-stream interference attributable to channel reuse among the plurality of streams.

13. A receiver circuit for determining combining weights for a Multiple-Input-Multiple-Output (MIMO) receiver comprising one or more processing circuits configured to:
compute intermediate combining weights for two received signal streams as a function of impairment correlations that do not account for cross-stream interference attributable to channel reuse between the two streams; and
compute final combining weights for at least one of the two streams as a function of the intermediate combining weights computed for the two streams and a weight scaling factor that accounts for the cross-stream interference attributable to channel reuse between the two streams.

14. The receiver circuit of claim 13, wherein the one or more processing circuits comprise an intermediate combining weight circuit configured to compute the intermediate combining weights, and a final combining weight circuit configured to compute the final combining weights.

15. The receiver circuit of claim 14, wherein the one or more processing circuits further comprise a weight scaling factor circuit configured to determine the weight scaling factors.

16. The receiver circuit of claim 13, wherein the one or more processing circuits further comprise one or more impairment correlation circuits configured to estimate the impairment correlations for the two streams.

17. The receiver circuit of claim 13, wherein the receiver circuit is configured to compute the intermediate combining weights for each of the two streams based on impairment correlation estimates common to both streams.

18. The receiver circuit of claim 17, wherein the receiver circuit is configured to compute the intermediate combining weights for each stream at least based on estimated impairment correlations arising from noise and same-cell interference common to both streams.

19. The receiver circuit of claim 18, wherein the receiver circuit is configured compute the intermediate combining weights for each stream further based on estimated impairment correlations arising from other-cell interference common to both streams.

20. The receiver circuit of claim 13, wherein the receiver circuit is configured to compute the weight scaling factor for a first one of the two streams as a function of the intermediate combining weights determined for the other one of the two streams and net stream responses determined for the two streams.

21. The receiver circuit of claim 20, wherein the receiver circuit is configured to compute the weight scaling factor further as a function of one or more channel reuse scaling factors that depend on relative transmit power allocations of the two streams.

22. The receiver circuit of claim 13, wherein the receiver circuit is configured to compute the final combining weights for a first one of the two streams by forming a linear combination of the intermediate combining weights determined for the first one of the two streams and the intermediate combining weights determined for the other one of the two streams, as scaled by the weight scaling factor.

23. The receiver circuit of claim 13, wherein the receiver circuit is configured to estimate signal quality for one of the two streams, where only one of the two streams is of interest to the receiver, based on the intermediate weights computed for the stream of interest.

24. The receiver circuit of claim 23, wherein the receiver circuit is configured to estimate signal qualities for the two streams when both streams are of interest to the receiver based on the final combining weights computed for the two streams.

25. The receiver circuit of claim 13, wherein the receiver circuit is configured to estimate signal quality for at least one of the two streams based on the intermediate combining weights computed for the at least one stream.

26. The receiver circuit of claim 13, wherein the receiver receives a plurality of streams, including the two streams, and wherein the receiver circuit is configured to compute intermediate and final combining weights for all streams of interest in the plurality of streams.

* * * * *